United States Patent
O'Toole

(10) Patent No.: US 6,190,450 B1
(45) Date of Patent: Feb. 20, 2001

(54) BAKING STONE AND COMPOSITION FOR MAKING THE SAME

(76) Inventor: Mark J. O'Toole, 18021 Alice La., Orland Pk, IL (US) 60467-8433

(*) Notice: Under 35 U.S.C. 154(b), the term of this patent shall be extended for 0 days.

(21) Appl. No.: 09/150,642

(22) Filed: Sep. 9, 1998

(51) Int. Cl.[7] .................................................. C04B 14/10
(52) U.S. Cl. ........................................... 106/711; 106/718
(58) Field of Search ..................................... 106/718, 719, 106/721, 737, 711

(56) References Cited

U.S. PATENT DOCUMENTS

| | | | |
|---|---|---|---|
| 4,115,135 | 9/1978 | Geoman | 106/711 |
| 4,127,417 | 11/1978 | Okada et al. | 106/711 |
| 4,229,225 | 10/1980 | Krazewski et al. | 106/643 |
| 4,293,343 | 10/1981 | Shannon | 106/711 |
| 4,363,666 | 12/1982 | Johnson et al. | 106/711 |
| 4,999,056 | 3/1991 | Rasmussen | 106/737 |
| 5,334,242 | 8/1994 | O'Toole | 106/711 |
| 5,958,131 * | 9/1999 | Asbridge et al. | 106/718 |

* cited by examiner

Primary Examiner—Paul Marcantoni
(74) Attorney, Agent, or Firm—Baker & McKenzie

(57) ABSTRACT

An improved asbestos-free composition for the manufacture of commercial baking stones and an improved baking stone made from the improved asbestos-free composition are disclosed. The baking stone is asbestos-free, non-hazardous and is ideal for commercial ovens designed for baking pizza and bread. The improved composition for the manufacture of baking stones includes 15–45% portland cement, 30–55% fireclay, 4–11% mullite, 2–6% silica, 0.5–3% glass fiber, 10–30% water and 0.03–1.5% of a plasticizer. After curing, the preferred water content of the cured baking stone will range from 6–10% and the composition of the cured baking stone will be 15–50% portland cement, 30–55% fireclay, 4–12% mullite, 2–7% silica, 0.5–3% glass fiber, 6–10% water and 0.03–1.5% of a plasticizer. Also disclosed is an improved composition for the manufacture of baking stones that includes a pigment in order to produce a colored baking stone.

34 Claims, No Drawings

BAKING STONE AND COMPOSITION FOR MAKING THE SAME

BACKGROUND OF THE INVENTION

1. Field of the Invention

This invention relates to baking stones for use in commercial ovens and specifically to baking stones for ovens designed to cook pizza and bread. The improvement contributed by this invention is an asbestos-free formula for the manufacture of commercial baking stones and an improved baking stone made from the improved asbestos-free formula.

2. Description of the Related Art

The commercial oven industry was forever changed by the discovery that asbestos can be hazardous to human health. Baking stones used as oven decks in commercial ovens were made from materials broadly described as transite. Transite is a hydraulically pressed cement-asbestos board and was mass produced from the 1940's until 1985. Since the production of transite was discontinued, the commercial oven industry has continually searched for an equivalent baking stone which provides the same baking qualities as transite.

The quality most desired in a baking stone is even or consistent thermal conductivity through the stone. If the baking stone conducts heat unevenly, the bottom portion of food resting on the stone will not cook evenly. For example, a pizza crust may be burned in some areas and actually undercooked in other areas. Of course, the baking stone must be resistant to cracking and delamination despite years of use at temperatures exceeding 500° F.

Transite was manufactured from a combination of portland cement and asbestos fibers. Manufacturers have continually searched for suitable fibers to combine with portland cement in order to achieve the desired baking qualities of transite. One such attempt is represented by the asbestos-free transite products. These products are manufactured from selected asbestos-free fibers and portland cement. The asbestos-free transite products are not a completely satisfactory replacement for asbestos-containing transite because of surface cracking, delamination and uneven thermal conductivity through the asbestos-free transite stone.

Another product which was developed to replace transite is sold under the name promassal. Promassal is a mixture of calcium silicate hydrates, calcium silicate fillers, phyllosilicate E fillers, natural organic fillers and residual quartz. However, promassal is characterized by the same inadequacies that characterize asbestos-free transite products. Namely, promassal baking stones are prone to surface cracking, delamination and uneven thermal conductivity through the stone. Specifically, promassal is not suitable for the higher temperatures used in baking pizza.

Another material commonly used for commercial oven baking stones is sold under the name cordierite. Cordierite is a magnesium-aluminum-silicate material. However, the cordierite stone is fragile and does not provide a consistent even cooking surface as required for hearth baked goods such as bread and pizza.

Other improved asbestos-free compositions for baking stones have been developed. For example, U.S. Pat. No. 5,334,242 discloses an improved composition for baking stones used in commercial ovens. The disclosed baking stone composition is asbestos-free, non-hazardous and is ideal for commercial ovens designed for baking pizza and bread. The improved composition includes portland cement, mortar or mason sand, glass fiber strands, water and a plasticizer.

However, in spite of the commercial availability of suitable asbestos-free baking stone compositions, there still exists a continuing need for improved asbestos-free baking stone compositions that produce a baking stone with greater thermal stability when subjected to numerous heating cycles in a commercial oven. It is well known that the thermal expansion of cement paste and aggregates differ. The effects of the difference in thermal expansion between cement paste and aggregates is very evident in baking stones which have been subject to heating cycles and temperature fluctuations in an oven. The continuous changes in oven temperatures often cause a significant break in the bond at the interface between the cement paste and the aggregates. Consequently, there has been a continuing need for an improved asbestos-free baking stone that provides for an extended service life even when the stone is subjected to heating cycles and temperature fluctuations in an oven.

Therefore, it is one object of the present invention to provide an improved asbestos-free baking stone that performs as well as or better than the asbestos-containing baking stones used in the past.

Another object of the present invention is to provide a baking stone that is highly resistant to surface cracking, highly resistant to delamination and provides even thermal conductivity through the stone.

Still another object of the present invention is to provide an improved asbestos-free baking stone that has greater thermal stability when subjected to numerous heating cycles in a commercial oven.

SUMMARY OF THE INVENTION

The present invention satisfies the foregoing objects and needs by way of an improved baking stone having increased thermal stability. The baking stone is made from a mixture of portland cement, calcined fireclay, mullite, silica, glass fiber, water and plasticizer. The portland cement may be a typical portland cement, such as types I, II, or III portland cement or a combination thereof. The calcined fireclay may be a volume stable, blast furnace quality grog or naturally occurring fired by volcanic action and ready for sizing after mining. The mullite and silica may be provided in a commercially available mixture and preferably, the silica is present in the form of amorphous silica and cristobalite. The glass fibers are preferably alkali resistant glass fibers provided in the form of chopped strands, scrim or mixtures thereof. The water may be tap water and need not be distilled. The plasticizer may be any commercially available plasticizer that is compatible with the above components. In another version of the invention, a pigment is added to the baking stone formulation in order to alter the appearance of the cured baking stone.

These and other features, aspects, objects, and advantages of the present invention will be become better understood upon consideration of the following detailed description and appended claims.

DESCRIPTION OF THE PREFERRED EMBODIMENTS

In accordance with the present invention, the composition for preparing a baking stone broadly comprises in weight percent of a just-mixed batch as follows:

Portland cement—from about 15% to about 45%;
Calcined Fireclay—from about 30% to about 55%;
Mullite—from about 4% to about 11%;
Silica—from about 2% to about 6%;

Glass Fiber—from about 0.5% to about 3%;
Water—from about 10% to about 30%; and
Plasticizer—from about 0.03% to about 1.5%.

The portland cement is necessary to provide structural strength and rigidity to the final product. If much less than about 15% of portland cement is used in the just-mixed batch, the requisite strength and rigidity, and hence the desired thermal stability, will not be achieved. Further, baking stones made with too much aggregate (i.e., fireclay, mullite and silica) and too little portland cement will shrink upon heating. If much above 45% portland cement is used in a just-mixed batch, the additional portland cement is not necessary and the economics of the product are adversely affected. Aside from the glass fibers, portland cement is the most expensive component of the baking stone. About 30% of type III portland cement is most preferred in conjunction with other preferred amounts of a just-mixed batch as discussed below.

Because the aggregate (fireclay, mullite and silica) is go cheaper than portland cement, it is preferable to use as much aggregate as possible without compromising the structural integrity or physical properties of the baking stone. The preferred ratio of portland cement to aggregate is about 0.55:1. If the portland cement to aggregate ratio drops much below 0.25:1, the thermal conductivity of the stone is compromised because the aggregate is an insulator, and consequently, a poor thermal conductor. Further, too much aggregate will decrease the strength of the stone.

If the portland cement to aggregate ratio greatly exceeds 1:1, the stone will be expensive to manufacture and will shrink upon heating as discussed above. Also, too little aggregate reduces the abrasive strength of the stone; the surface of the stone will be less resistant to wear and tear and will have a shorter working life. In a just-mixed batch, the aggregate content should range from about 36% to about 72%. The most preferred aggregate content of a just-mixed batch is about 54%.

The aggregate used in the present invention contains calcined fireclay, mullite and silica. A suitable calcined fireclay for use in the aggregate is a commercially available calcined fireclay sold under the trade name "High Duty Grog" by Maryland Refractories Company of Irondale, Ohio. A typical chemical analysis of the "High Duty Grog" calcined fireclay is as follows: 48–56% $SiO_2$; 35–45% $Al_2O_3$; less than 4% $Fe_2O_3$; less than 3% CaO; and less than 4% $TiO_2$. The mullite and silica components used in the aggregate are commercially available in a mullite/silica mixture sold under the trade name "Mulcoa 47" by C-E Minerals of King of Prussia, Penn. "Mulcoa 47" has a composition of about 65% mullite ($3Al_2O_3 \cdot 2SiO_2$), 10–20% amorphous silica ($SiO_2$), and 15–25% cristobalite, a crystalline form of silica. Accordingly, the silica component is about 35% of the "Mulcoa 47", and the ratio of amorphous silica to cristobalite in the silica component of the "Mulcoa 47" may range from 2:5 to 4:3. The most preferred amount of aggregates in a just-mixed batch is about 54% in conjunction with the preferred amounts discussed below. Preferably, the 54% amount of aggregates is obtained by using 21.5% #10 mesh, calcined fireclay (i.e., the fireclay has passed through a #10 mesh); 21.5% #5 mesh, calcined fireclay; and 11% of a #35 mesh mullite/silica mixture having a 65:35 ratio of mullite to silica.

The glass fibers act as capillaries that hold the cement together as the stone is heated. Without the fibers, the stone may crack at high temperatures. Due to their high density, glass fibers present in excess of 3% may inhibit the mixing of the cement slurry and would not allow the batch to settle. Glass fibers in an amount much less than 0.5% will not provide the requisite structural integrity. The preferred glass fiber is an alkali-resistant glass fiber (ARG Fiber) available from Nippon Electric Glass America, Inc.. This ARG Fiber has a 0.00053" fiber diameter and contains 20% zirconia. The ARG Fiber is commercially available in the form of chopped strands having a 0.50" cut length, or scrim. Scrim is a structural form of glass fiber reinforcement in which the strands are continuous and are laid down in two directions at 90 degrees. One preferred form of ARG Fiber scrim has double strands of the glass fiber positioned at 90 degrees such that 0.375" inch openings are formed in the scrim. This scrim has a density of 0.26 oz./$ft^2$ ($1.13 \times 10^{-4}$ lb./$in^2$). The openings in the scrim allow the baking stone composition to fully penetrate and wet out the fibers without causing separation of the water from the remainder of the baking stone composition. The most preferred amount of ARG Fiber in a just-mixed batch is about 1.8% in conjunction with the preferred amounts discussed below. The ARG Fiber may be present as chopped strands, scrims or a mixture thereof.

Water is necessary for mixing the portland cement, aggregates and glass fiber. Drinkable tap water is adequate and distilled or purified water is not required. An excess of 30% water at mixing requires longer cure times and may cause the cured baking stone to begin cracking at the edges of the stone. Much less than 10% water at mixing will not provide an adequate slurry and will therefore adversely affect the cementation of the ingredients. The most preferred amount of water is about 14% at mixing in conjunction with the other preferred amounts discussed below.

The plasticizer is employed to give high early strength to the baking stone and increase workability of the concrete during mixing and troweling. The preferred plasticizer is Rheobuild 1000 Super Plasticizer. An excess of 1.5% would adversely effect the economics of the finished product without providing any added benefit and much less than about 0.03% would not provide the desired effects. The most preferred amount of Rheobuild 1000 Super Plasticizer is about 0.05% in conjunction with the other preferred amounts discussed below.

The improved baking stone of the present invention is typically manufactured in 1.5"×24"×36" plates. To manufacture one plate of the preferred size, the most preferred just-mixed composition is the following wherein all percentages are in weight percent:

portland cement—34.4 lbs./about 30%;
10 mesh calcined fireclay—24.8 lbs./about 21.5%;
5 mesh calcined fireclay—24.8 lbs./about 21.5%;
35 mesh "Mulcoa 47" 65% mullite/35% silica—13.0 lbs./about 11%;
alkali resistant glass fiber chopped strands (0.00053" diameter, 0.500" cut length)—2.0 lbs./about 1.7%;
water—16.00 lbs./about 14%; and
plasticizer—0.06 lbs./about 0.05%.

In addition, one or more layers of alkali resistant glass fiber scrim having double strands of the fiber at 90 degrees and having 0.375" inch openings is positioned in the entire area of a 1.5"×24"×36" mold. Given the scrim density of 0.26 oz./$ft^2$, the weight of one layer of scrim used in the most preferred composition is 0.1 pounds or about 0.08%.

The above weight percentages are mixing weight percentages. After curing, the preferred water content will range from 6–10%. In the most preferred embodiment discussed above, the amount of water in the cured stone is about 8%. Thus, the composition of a cured baking stone of the most preferred embodiment is the following wherein all percentages are in weight percent:

portland cement—about 32%;
calcined fireclay—about 46%;
mullite—about 8%
silica—about 4%;
alkali resistant glass fiber chopped strands—about 1.8%;
alkali resistant glass fiber scrim—about 0.1%;
water—about 8%; and
plasticizer—about 0.1%.

The preferred process for manufacturing the improved baking stones is as follows. First, the portland cement, calcined fireclay, "Mulcoa 47" mullite/silica mixture, and water are mixed for one minute in a high speed disperser at approximately 1,100 rpm. Suitable dispersers include the DK51, DK101 and DK102 mixing systems sold by Shar Inc. of Ft. Wayne, Ind. Alternative systems are found in the VHS300 and VHS400 variable high speed dispersers sold by Schold Machine Company of Chicago, Ill. and St. Petersburg, Fl. After the portland cement, fireclay, "Mulcoa 47" and water are mixed for one minute, the plasticizer is added and the mixture is blended for another thirty seconds. Then, the speed is reduced to about 600 rpm and the chopped strand glass fibers are added to the batch. The fibers are mixed into the batch at the lower speed for approximately thirty seconds. Thus, the mixing process for a 1.5"×24"×36" baking stone takes approximately two minutes.

After the mixing is completed, the batch is poured into a high strength plastic, fiberglass or steel mold optionally having 1 or 2 layers of glass fiber scrim arranged in the mold. These molds are then placed on vibratory tables and vibrated electrically or pneumatically for approximately two minutes. Suitable vibratory table manufacturers include Vibco, Inc. of Wyoming, R.I. and Martin Engineering Company of Neponset, Ill. These tables are used to compact and settle the slurry within the mold as well as release any air trapped in the slurry. After the mold has been vibrated for several minutes, it is transported to a work table where the exposed surface is smoothed, preferably with a trowel. The batch is then allowed to cure in the mold for twenty-four hours at room temperature conditions. After the initial twenty-four hour cure time during which the batch sets up to a degree sufficient to be self-supporting, the baking stone is then removed and cured for twenty-eight days or longer at room temperature conditions before shipment.

Baking stones were prepared by the above method using the just mixed compositions shown in the following Examples 1–5 in Table 1.

TABLE 1

(All percentages are weight percentages.)

| Component | Example 1 | Example 2 | Example 3 | Example 4 | Example 5 |
|---|---|---|---|---|---|
| Portland Cement (Type III) | 34.40# 29.87% | 34.40# 30.67% | 34.40# 28.57% | 20.86# 18.11% | 48.02# 41.69% |
| Calcined Fireclay #5 Mesh | 24.80# 21.54% | 24.80# 22.11% | 24.80# 20.60% | 30.17# 26.19% | 19.41# 16.85% |
| Calcined Fireclay #10 Mesh | 24.80# 21.54% | 24.80# 22.11% | 24.80# 20.60% | 30.17# 26.19% | 19.41# 16.85% |
| "Mulcoa 47" #35 Mesh | 13.00# 11.29% | 13.00# 11.59% | 13.00# 10.80% | 15.81# 13.73% | 10.17# 8.83% |
| ARG Glass | 0.10# | 0.10# | 0.10# | 0.10# | 0.10# |
| Fiber Scrim | 0.08% | 0.09% | 0.08% | 0.08% | 0.08% |
| ARG Glass Fiber Chopped Strands | 2.00# 1.74% | 2.00# 1.78% | 2.00# 1.66% | 2.00# 1.74% | 2.00# 1.74% |
| Water | 16.00# 13.89% | 13.00# 11.59% | 21.25# 17.65% | 16.00# 13.89% | 16.00# 13.89% |
| Plasticizer | 0.06# 0.05% | 0.06# 0.06% | 0.06# 0.05% | 0.06# 0.05% | 0.06# 0.05% |

Example 1 is the most preferred composition for preparing a baking stone. In Example 2, the amount of water added to the composition was decreased to a lower level. In Example 3, the amount of water in the composition was increased. In the compositions of Examples 4 and 5, the amount of water used was equal to the amount of water used in Example 1; however, the cement to aggregate ratio was decreased in Example 4 and the cement to aggregate ratio was increased in Example 5.

Examples 1–5 produced baking stones having an "as cured" water level of 6–10%. Therefore, a cured baking stone in accordance with the present invention has a composition comprising the following in percentages by weight: portland cement—from about 15% to about 50%; calcined fireclay—from about 30% to about 55%; mullite—from about 4% to about 12%; silica—from about 2% to about 7%; glass fiber—from about 0.5% to about 3%; water—from about 6 to about 10%; and plasticizer—from about 0.03% to about 1.5%.

The cured baking stones of Examples 1–5 had an average density of 135 pounds per cubic foot and were able to withstand temperatures up to 1500° F. The baking stones had a thermal conductivity from 4 to 5.5 BTU/(ft$^2$·hr)/(° F./in.) per ASTM C-177-95 at baking temperatures of 450°–650° F.

Field tests confirmed that the baking stones prepared from the compositions of Examples 1–5 are thermally stable, shock resistant, and do not cause the volume expansion problems associated with other known baking stones.

In recent years, there has been increasing demand for baking stones having a color other than the typical gray or white color of concrete based products. In view of the demand in the baking stone industry for colored baking stones, a second "colored" version of the baking stone of the present invention was prepared using a formulation that included a pigment.

In accordance with the second "colored" version of the present invention, the composition for preparing a colored baking stone broadly comprises in weight percent of a just-mixed batch as follows:

Portland cement—from about 15% to about 45%;
Calcined Fireclay—from about 30% to about 55%;
Mullite—from about 4% to about 11%;
Silica—from about 2% to about 6%;
Glass Fiber—from about 0.5% to about 3%;
Water—from about 10% to about 30%;
Plasticizer—from about 0.03% to about 1.5%; and
Pigment—from about 0.1% to about 1.0%.

In order to test the effects of a pigment on the properties of a cured baking stone, the formulations of Examples 1–5 were modified to include a pigment. The preferred pigments are iron oxide or chromium oxide pigments. Suitable iron oxide and chromium oxide pigments are available from Hoover Color Corporation, Hiwassee, Va. Most preferably, the iron oxide and chromium oxide pigments are selected from Hoover Color Corporation's line of products entitled "Pigments for Coloring Concrete Products" or Hoover Color Corporation's "Synox" line of iron oxide and chromium oxide pigments. These pigments are available in a wide variety of colors including red, yellow, black, green, brown, and blue.

Baking stones were prepared by the method described above using the just mixed compositions shown in the following Examples 6–10 in Table 2. The compositions of Examples 6–10 were prepared three times using three different pigments: (1) an iron oxide pigment, (2) a chromium oxide pigment, and (3) a pigment containing iron oxide and silica. The pigment was added to the composition along with the portland cement in each Example.

TABLE 2

(All percentages are weight percentages.)

| Component | Example 6 | Example 7 | Example 8 | Example 9 | Example 10 |
|---|---|---|---|---|---|
| Portland Cement (Type III) | 34.40#<br>29.73% | 34.40#<br>30.64% | 34.40#<br>28.33% | 20.86#<br>18.02% | 48.02#<br>41.49% |
| Calcined Fireclay #5 Mesh | 24.80#<br>21.43% | 24.80#<br>22.09% | 24.80#<br>20.43% | 30.17#<br>26.07% | 19.41#<br>16.77% |
| Calcined Fireclay #10 Mesh | 24.80#<br>21.43% | 24.80#<br>22.09% | 24.80#<br>20.43% | 30.17#<br>26.07% | 19.41#<br>16.77% |
| "Mulcoa 47" #35 Mesh | 13.00#<br>11.23% | 13.00#<br>11.58% | 13.00#<br>10.71% | 15.81#<br>13.66% | 10.17#<br>8.79% |
| ARG Glass Fiber Scrim | 0.10#<br>0.08% | 0.10#<br>0.09% | 0.10#<br>0.08% | 0.10#<br>0.08% | 0.10#<br>0.08% |
| ARG Glass Fiber Chopped Strands | 2.00#<br>1.73% | 2.00#<br>1.78% | 2.00#<br>1.65% | 2.00#<br>1.73% | 2.00#<br>1.73% |
| Water | 16.00#<br>13.83% | 13.00#<br>11.58% | 21.25#<br>17.50% | 16.00#<br>13.83% | 16.00#<br>13.83% |
| Plasticizer | 0.06#<br>0.05% | 0.06#<br>0.06% | 0.06#<br>0.05% | 0.06#<br>0.05% | 0.06#<br>0.05% |
| Pigment (Chromium or Iron Oxide) | 0.56#<br>0.49% | 0.13#<br>0.11% | 1.00#<br>0.82% | 0.56#<br>0.49% | 0.56#<br>0.49% |

Example 6 is the most preferred composition for preparing a colored baking stone. It can be seen by a comparison of the compositions of Example 1 and Example 6 that Example 6 uses the same component raw weights as Example 1 with the addition of 0.56 pounds of pigment. In Example 7, the amount of water added to the composition was decreased to a lower level and the amount of pigment was decreased. In Example 8, the amount of water in the composition was increased and the amount of pigment was increased. In the compositions of Examples 9 and 10, the amount of water and pigment used was equal to the amount of water and pigment used in Example 6; however, the cement to aggregate ratio was decreased in Example 9 and the cement to aggregate ratio was increased in Example 10.

Examples 6–10 produced colored baking stones having an "as cured" water level of 6–10%. Therefore, a cured baking stone in accordance with the second "colored" version of the present invention has a composition comprising the following in percentages by weight: portland cement—from about 15% to about 50%; calcined fireclay—from about 30% to about 55%; mullite—from about 4% to about 12%; silica—from about 2% to about 7%; glass fiber—from about 0.5% to about 3%; water—from about 6 to about 10%; plasticizer—from about 0.03% to about 1.5%; and pigment—from about 0.1% to about 1.0%.

The cured "colored" baking stones of Examples 6–10 exhibited the same density and thermal conductivity as the cured "natural color" baking stones of Examples 1–5. In addition, field tests confirmed that the baking stones prepared from the compositions of Examples 6–10 are thermally stable, shock resistant, and do not cause the volume expansion problems associated with other known baking stones. Consequently, it is evident that the addition of a pigment to a baking stone made in accordance with the present invention does not affect the improved thermal stability of the baking stones of the present invention.

Thus, it is seen that an improved asbestos-free composition for the manufacture of commercial baking stones and an improved baking stone made from the improved asbestos-free composition are provided. The disclosed baking stone and composition have advantages over prior baking stones and compositions as the composition of the present invention is asbestos-free and produces baking stones having improved thermal stability. The baking stone and composition are also available in colored versions which exhibit the same improved thermal stability as the natural color versions. While the disclosed preferred compositions produce a baking stone having improved thermal stability, further ingredients may also be added to the preferred compositions without adversely affecting the thermal stability. Therefore, although the present invention has been described in considerable detail with reference to certain preferred embodiments, one skilled in the art will appreciate that the present invention can be practiced by other than the preferred embodiments, which have been presented for purposes of illustration and not of limitation. Accordingly, the scope of the appended claims should not be limited to the description of the preferred embodiments contained herein.

What is claimed is:

1. A composition for preparing a baking stone for use at temperatures exceeding 500° F., the composition comprising the following with percentages where indicated being by weight:

portland cement—from about 15% to about 45%;

an aggregate mixture comprised of a material selected from the group consisting of calcined fireclay, mullite and mixtures thereof;

glass fiber—from about 0.5% to about 3%;

water—from about 10% to about 30%; and plasticizer—from about 0–03% to about 1.5%.

2. The composition of claim 1 wherein the composition comprises the following in percentages by weight:

portland cement—from about 15% to about 45%;

calcined fireclay—from about 30% to about 55%;

mullite—from about 4% to about 11%;

silica—from about 2% to about 6%;

glass fiber—from about 0.5% to about 3%;

water—from about 10% to about 30%; and plasticizer—from about 0.03% to about 1.5%.

3. The composition of claim 2 wherein the composition further comprises the following in percentages by weight:

pigment—from about 0.1% to about 1.0%.

4. The composition of claim 3 wherein the glass fiber is in a form selected from the group consisting of chopped strands, scrim, and mixtures thereof.

5. The composition of claim 4 wherein the calcined fireclay comprises from about 48% to about 56% $SiO_2$, and from about 35% to about 45% $Al_2O_3$.

6. The composition of claim 5 wherein the silica consists of amorphous silica and cristobalite.

7. The composition of claim 6 wherein the ratio of amorphous silica to cristobalite in the silica ranges from 2:5 to 4:3.

8. A composition for preparing a baking stone for use at temperatures exceeding 500° F., the composition consisting essentially of the following with percentages where indicated being by weight:
  portland cement—from about 15% to about 45%;
  an aggregate mixture comprised of a material selected from the group consisting of a calcined fireclay, mullite, silica and mixtures thereof;
  glass fiber—from about 0.5% to about 3%;
  water—from about 10% to about 30%; and
  plasticizer—from about 0.03% to about 1.5%.

9. The composition of claim 8 wherein the composition consists essentially of the following in percentages by weight:
  portland cement—from about 15% to about 45%;
  calcined fireclay—from about 30% to about 55%;
  mullite—from about 4% to about 11%;
  silica—from about 2% to about 6%;
  glass fiber—from about 0.5% to about 3%;
  water—from about 10% to about 30%; and
  plasticizer from about 0.03% to about 1.5%.

10. The composition of claim 9 wherein the glass fiber is in a form selected from the group consisting of chopped strands, scrim, and mixtures thereof.

11. The composition of claim 10 wherein the calcined fireclay comprises from about 48% to about 56% $SiO_2$, and from about 35% to about 45% $Al_2O_3$.

12. The composition of claim 11 wherein the silica consists of amorphous silica and cristobalite.

13. A composition for preparing a baking stone for use at temperatures exceeding 500° F., the composition consisting essentially of the following with percentages where indicated being by weight:
  portland cement—from about 15% to about 45%;
  an aggregate mixture comprised of a material selected from the group consisting of calcined fireclay, mullite, silica and mixture thereof;
  glass fiber—from about 0.5% to about 3%;
  water—from about 10% to about 30%;
  plasticizer—from about 0.03% to about 1.5%; and
  pigment—from about 0.1% to about 1.0%.

14. The composition of claim 13 wherein the composition consists essentially of the following in percentages by weight:
  portland cement—from about 15% to about 45%;
  calcined fireclay—from about 30% to about 55%;
  mullite—from about 4% to about 11%;
  silica—from about 2% to about 6%;
  glass fiber—from about 0.5% to about 3%;
  water—from about 10% to about 30%;
  plasticizer—from about 0.03% to about 1.5%; and
  pigment—from about 0.1% to about 1.0%.

15. The composition of claim 14 wherein the glass fiber is in a form selected from the group consisting of chopped strands, scrim, and mixtures thereof.

16. The composition of claim 15 wherein the calcined fireclay comprises from about 48% to about 56% $SiO_2$, and from about 35% to about 45% $Al_2O_3$.

17. The composition of claim 16 wherein the silica consists of amorphous silica and cristobalite.

18. A cured baking stone for use at temperatures exceeding 500° F., the cured baking stone having a composition comprising the following with percentages where indicated being by weight:
  portland cement—from about 15% to about 50%;
  an aggregate mixtures comprised of a material selected from the group consisting of calcined fireclay, mullite, silica and mixture thereof;
  glass fiber—from about 0.5% to about 30%;
  water—from about 6 to about 10%; and
  plasticizer—from about 0.03% to about 1.5%.

19. The baking stone of claim 18 wherein the composition comprises the following in percentages by weight:
  portland cement—from about 15% to about 50%;
  calcined fireclay—from about 30% to about 55%;
  mullite—from about 4% to about 12%;
  silica—from about 2% to about 7%;
  glass fiber—from about 0.5% to about 3%;
  water—from about 6 to about 10%; and
  plasticizer—from about 0.03% to about 1.5%.

20. The composition of claim 19 wherein the composition further comprises the following in percentages by weight:
  pigment—from about 0.1% to about 1.0%.

21. The baking stone of claim 20 wherein the glass fiber is in a form selected from the group consisting of chopped strands, scrim, and mixtures thereof.

22. The baking stone of claim 21 wherein the calcined fireclay comprises from about 48% to about 56% $SiO_2$, and from about 35% to about 45% $Al_2O_3$.

23. The baking stone of claim 22 wherein the silica consists of amorphous silica and cristobalite.

24. The baking stone of claim 23 wherein the ratio of amorphous silica to cristobalite in the silica ranges from 2:5 to 4:3.

25. A cured baking stone for use at temperature exceeding 500° F., the cured baking stone having a composition consisting essentially of the following with percentages where indicated being by weight:
  portland cement—from about 15% to about 50%;
  an aggregate mixture comprised of a material selected from the group consisting of calcined fireclay, mullite, silica and mixture thereof;
  glass fiber—from about 0.5% to about 3%;
  water—from about 6 to about 10%; and
  plasticizer—from about 0.03% to about 1.5%.

26. The baking stone of claim 25 wherein the composition consists essentially of the following in percentages by weight:
  portland cement—from about 15% to about 50%;
  calcined fireclay—from about 30% to about 55%;
  mullite—from about 4% to about 12%;
  silica—from about 2% to about 7%;
  glass fiber—from about 0.5% to about 3%;
  water—from about 6 to about 10%; and
  plasticizer—from about 0.03% to about 1.5%.

27. The baking stone of claim 26 wherein the glass fiber is in a form selected from the group consisting of chopped strands, scrim, and mixtures thereof.

28. The baking stone of claim 27 wherein the calcined fireclay comprises from about 48% to about 56% $SiO_2$, and from about 35% to about 45% $Al_2O_3$.

29. The baking stone of claim 28 wherein the silica consists of amorphous silica and cristobalite.

30. A cured baking stone for use at temperatures exceeding 500° F., the cured baking stone having a composition consisting essentially of the following with percentages indicated by weight:

portland cement—from about 15% to about 50%;

an aggregate mixture comprised of a material selected from the group consisting of calcined fireclay, mullite, silica and mixture thereof;

glass fiber—from about 0.5% to about 3%;

water—from about 6 to about 10%;

plasticizer—from about 0.03% to about 1.5%; and pigment—from about 0.1% to about 1.0%.

31. The baking stone of claim 30 wherein the composition consists essentially of the following in percentages by weight:

portland cement—from about 15% to about 50%;

calcined fireclay—from about 30% to about 55%;

mullite—from about 4% to about 12%;

silica—from about 2% to about 7%;

glass fiber—from about 0.5% to about 3%;

water—from about 6 to about 10%;

plasticizer—from about 0.03% to about 1.5%; and pigment—from about 0.1% to about 1.0%.

32. The baking stone of claim 31 wherein the glass fiber is in a form selected from the group consisting of chopped strands, scrim, and mixtures thereof.

33. The baking stone of claim 32 wherein the calcined fireclay comprises from about 48% to about 56% $SiO_2$, and from about 35% to about 45% $Al_2O_3$.

34. The baking stone of claim 33 wherein the silica consists of amorphous silica and cristobalite.

* * * * *